US006731132B2

United States Patent
Aloisi (10) Patent No.: US 6,731,132 B2
(45) Date of Patent: May 4, 2004

(54) PROGRAMMABLE LINE TERMINATOR

(75) Inventor: Paul D. Aloisi, Merrimack, NH (US)

(73) Assignee: Texas Instruments Incorporated, Dallas, TX (US)

(*) Notice: Subject to any disclaimer, the term of this patent is extended or adjusted under 35 U.S.C. 154(b) by 19 days.

(21) Appl. No.: 10/175,979

(22) Filed: Jun. 20, 2002

(65) Prior Publication Data

US 2003/0234663 A1 Dec. 25, 2003

(51) Int. Cl.[7] .............................................. H03K 17/16
(52) U.S. Cl. ............................ 326/30; 86/90; 710/100; 710/126
(58) Field of Search ....................... 326/30, 86, 90; 710/100, 126–132, 300–302

(56) References Cited

U.S. PATENT DOCUMENTS

| | | | |
|---|---|---|---|
| 5,613,074 A | | 3/1997 | Galloway .................... 395/280 |
| 5,920,266 A | * | 7/1999 | Allgood et al. ............. 710/300 |
| RE36,789 E | * | 7/2000 | Mandel et al. ................ 326/30 |
| 6,108,740 A | * | 8/2000 | Caldwell ..................... 710/305 |
| 6,205,504 B1 | | 3/2001 | Faust et al. .................. 710/126 |
| 6,246,255 B1 | | 6/2001 | Takizawa ...................... 326/30 |
| 6,378,025 B1 | * | 4/2002 | Getty ......................... 710/300 |
| 6,529,037 B1 | * | 3/2003 | Haycock et al. .............. 326/30 |

OTHER PUBLICATIONS

*27–Line 3–V–5–V LVD Terminator for Wide Ultra2, Ultra3, Ultra160, and Ultra320 SCSI with Integrated SPI–3 Delay*, Texas Instruments, UCC5686, UCC5687, 2000, pp.1–5.

* cited by examiner

*Primary Examiner*—Vibol Tan
(74) *Attorney, Agent, or Firm*—W. Daniel Swayze, Jr.; W. James Brady; Frederick J. Telecky, Jr.

(57) ABSTRACT

A programmable line terminator device that can optimally terminate a transmission line or bus even if the line impedance is variable or not well defined. The line terminator includes a programmable multi-line active terminator for terminating the bus. The line terminator provides programmable termination impedance and bias for a plurality of lines on the bus. The line terminator may be uniquely addressed and programmed via address and control signals carried by one or more of the lines on the bus. The line terminator detects what type of bus it is terminating and what types of devices are connected to the bus. The line terminator includes a mechanism for adjusting the termination impedance and bias for the lines on the bus based on the bus type, the types of devices connected to the bus, and/or the control signals carried by the bus or one or more lines separate from the bus.

21 Claims, 4 Drawing Sheets

PROGRAMMABLE LINE TERMINATOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to devices for terminating transmission lines and buses, and more specifically to line terminators configured to provide adjustable termination impedance.

Line terminators are commonly used in computers and other electronic systems and devices for terminating transmission lines and buses to preserve the integrity of signals or data carried by the transmission lines and buses. For example, an electronic system may include one or more buses such as a Small Computer System Interface (SCSI) bus having one or more SCSI-compatible devices or peripherals (e.g., disk drives, CD-ROM drives, optical drives, and/or tape units) connected thereto. The SCSI devices are typically accessed through a SCSI controller, which is also connected to the SCSI bus. The SCSI controller employs respective device drivers to generate signals for controlling the SCSI devices on the SCSI bus. In order to maintain the integrity of the control signals and data carried by the SCSI bus, the bus is normally terminated at each end by a respective line terminator device. Each line terminator is configured to prevent reflections at the end of the SCSI bus, which may distort the signals carried by the bus and/or cause data errors to appear on the bus.

A conventional line terminator device for terminating transmission lines and buses may be configured to provide either "passive" termination or "active" termination. For example, a line terminator for terminating a SCSI bus may be configured to provide an impedance of about 220 $\Omega$ to Terminal Power (e.g., 5 V) and about 330 $\Omega$ to ground potential for passive termination. Alternatively, a line terminator may employ one or more voltage regulators and resistors for active termination of a SCSI bus carrying data at high data rates.

One drawback of conventional line terminator devices is that they often fail to provide optimal termination impedance when the line impedance is variable or not well defined during the design of an electronic system or device. This is because such line terminators are typically configured for terminating transmission lines and buses having precisely known line impedance values. For example, the impedance of a SCSI bus may vary based on the number and/or type of SCSI devices or peripherals connected to the bus. Because conventional line terminators are typically configured to match known line impedance values, when the line impedance changes, optimal termination impedance frequently cannot be achieved.

It would therefore be desirable to have a line terminator device for providing optimal termination impedance for a transmission line or bus. Such a line terminator would be capable of optimally terminating a transmission line or bus even if the impedance of the transmission line or bus is variable or not well defined.

BRIEF SUMMARY OF THE INVENTION

In accordance with the present invention, a line terminator device is provided that can optimally terminate a transmission line or bus even if the line impedance is variable or not well defined. Benefits of the presently disclosed line terminator are achieved by making the line terminator programmable, thereby allowing the line terminator to be programmably configured for providing optimal termination impedance for the transmission line or bus.

In one embodiment, the line terminator device comprises a programmable multi-line active terminator configured to terminate at least one transmission line or bus. The line terminator is operative to provide programmable termination impedance and bias for a plurality of lines on the bus. The line terminator may be uniquely addressed and programmed via address and control signals carried by one or more of the lines on the bus. Alternatively, the line terminator may be connected to one or more lines separate from the bus, and subsequently addressed and programmed via address and control signals carried by these separate lines. The line terminator employs a plurality of switches for setting its unique address. The line terminator is configured to detect what type of bus it is terminating and what types of devices are connected to the bus. The line terminator includes a mechanism for programmably adjusting the termination impedance and bias for the lines on the bus based on the bus type, the types of devices connected to the bus, and/or the control signals carried by the bus or the separate lines.

By providing a programmable line terminator device that can supply programmable termination impedance and bias for a plurality of transmission lines having line impedance values that may be variable or not well defined, increased signal bandwidth, reduced signal distortion, and high data rates with reduced error can be achieved.

Other features, functions, and aspects of the invention will be evident from the detailed description of the invention that follows.

BRIEF DESCRIPTION OF THE SEVERAL VIEWS OF THE DRAWING

The invention will be more fully understood with reference to the following detailed description of the invention in conjunction with the drawings of which.

DETAILED DESCRIPTION OF THE INVENTION

A programmable line terminator device is disclosed that can provide optimal termination impedance and bias for one or more transmission lines or buses to increase signal bandwidth, reduce signal distortion, and/or increase data rates with reduced data error.

Figure 1:
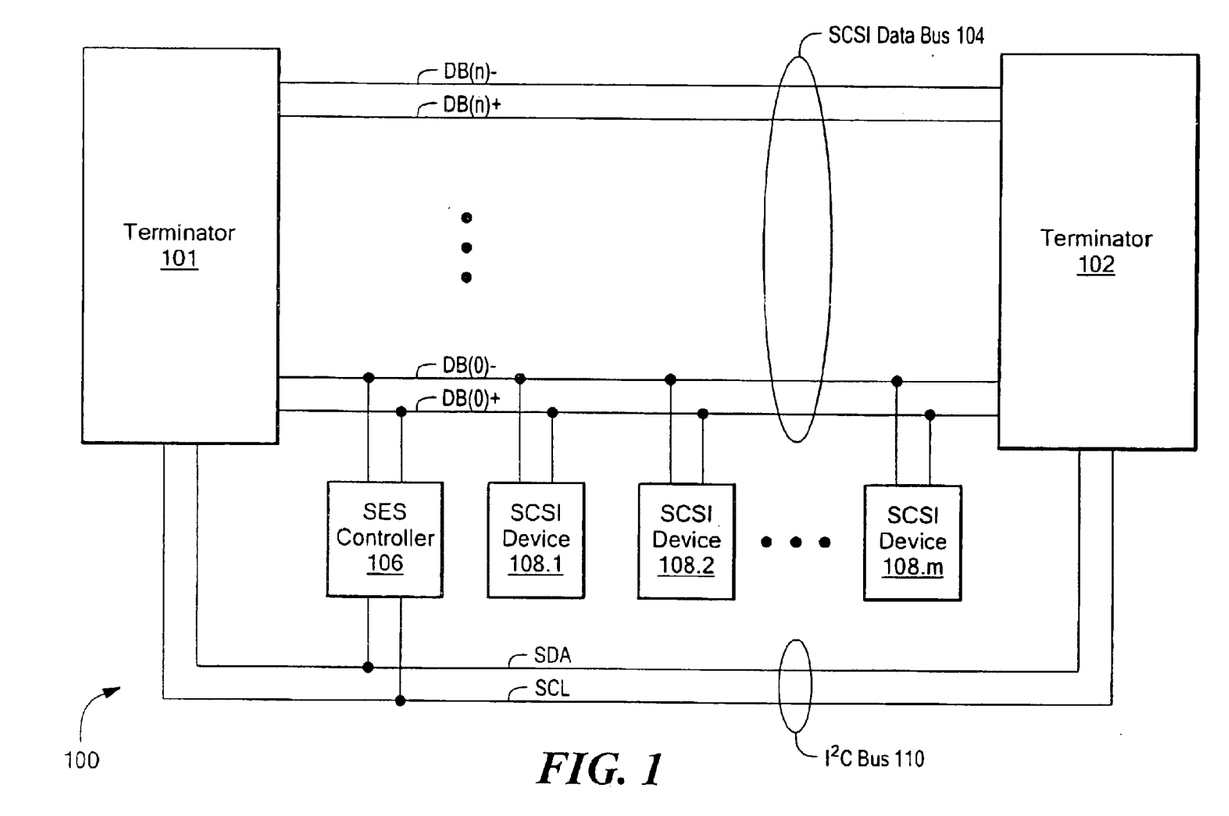
FIG. 1 is a block diagram of an electronic system including a bus terminated at each end by respective programmable line terminator devices according to the present invention.

FIG. 1 depicts an illustrative embodiment of an electronic system 100 including a bi-directional parallel data bus 104 terminated at each end by respective programmable line terminator devices 101–102, in accordance with the present invention. In the illustrated embodiment, the parallel data bus 104 comprises a Small Computer System Interface (SCSI) data bus DB(0)–, DB(0)+ through DB(n)–, DB(n)+. For example, the SCSI data bus 104 may comprise a Low Voltage Differential (LVD) SCSI bus or a High Power Differential (HIPD) SCSI bus. It is understood, however, that the SCSI data bus 104 may alternatively comprise a Single Ended (SE) SCSI bus or any other suitable SCSI-compatible or non-SCSI bus. In the presently disclosed embodiment, the SCSI data bus 104 is configured to be compliant with the final or most recent published drafts of the SPI-2, SPI-3, SPI-4, Ultra2, Ultra3, Ultra160, and/or Ultra320 SCSI specifications, each of which is incorporated herein by reference.

The system 100 further includes a controller 106 and a plurality of SCSI-compatible devices 108.1–108.m, each of which is operatively connected to the SCSI data bus 104. In the illustrated embodiment, the SCSI devices 108.1–108.m comprise respective storage devices such as disk drives, CD-ROM drives, optical drives, tape units, or any other suitable SCSI-compatible devices. It is noted that one or more of the SCSI devices 108.1–108.m may form a SCSI enclosure comprising a plurality of SCSI storage devices. It is understood, however, that one or more of the devices 108.1–108.m may alternatively comprise a suitable non-SCSI device or enclosure. Each of the SCSI devices 108.1–108.m on the SCSI data bus 104 is accessed through the controller 106, which in the presently disclosed embodiment comprises a SCSI Enclosure Services (SES) controller or any other suitable SCSI-compatible controller.

Moreover, the system 100 comprising the SCSI data bus 104, the SES controller 106, and the SCSI devices 108.1–108.m may be networked or otherwise connected to a computer system comprising a host computer (not shown). In the illustrated embodiment, each of the SES controller 106 and the SCSI devices 108.1–108.m has its own unique address on the SCSI data bus 104. The SES controller 106 and the SCSI devices 108.1–108.m can therefore be individually accessed by the host computer via their respective addresses. For example, the host computer may access the SES controller 106 using the SES protocol or any other suitable communications protocol.

Like the SES controller 106 and the SCSI devices 108.1–108.m, each of the programmable line terminator devices 101–102 has its own unique address. However, whereas the SES controller 106 and the SCSI devices 108.1–108.m are addressed and controlled by the host computer through the parallel data bus 104, the programmable line terminator devices 101–102 are addressed and programmed via address and control signals provided by the SES controller 106 over an Inter-IC ($I^2C$) bus 110. In the presently disclosed embodiment, the $I^2C$ bus 110 is configured to be compliant with the $I^2C$ Bus Specification, version 2.1 (2000), which is incorporated herein by reference.

Specifically, the $I^2C$ bus 110 comprises a 2-wire bi-directional serial bus including a Serial Data (SDA) line configured to carry data, address, and/or control signals between the SES controller 106 and the line terminator devices 101–102, and a Serial Clock (SCL) line configured to carry clock signals for controlling access to the $I^2C$ bus 110 and the transfer of data. It is noted that SES controllers such as the SES controller 106 may be configured to employ $I^2C$ buses for monitoring and controlling SCSI devices and enclosures on SCSI data buses. In accordance with the above-referenced $I^2C$ Bus Specification, the SES controller 106 is configured as a master device on the $I^2C$ bus 110 while the line terminator devices 101–102 are configured as slave devices on the bus 110. It is understood, however, that the $I^2C$ bus 110 may alternatively be arranged in a multi-master configuration in the event there is more than one master device on the bus 110.

It should be further understood that in alternative embodiments, the line terminator devices 101–102 may be addressed and programmed via address and control signals carried by one or more lines on the SCSI data bus 104, or one or more non-$I^2C$ compatible lines separate from the SCSI data bus 104. The line terminator devices 101–102 described herein are controlled through the $I^2C$ bus 110 for purposes of illustration.

Figure 2:
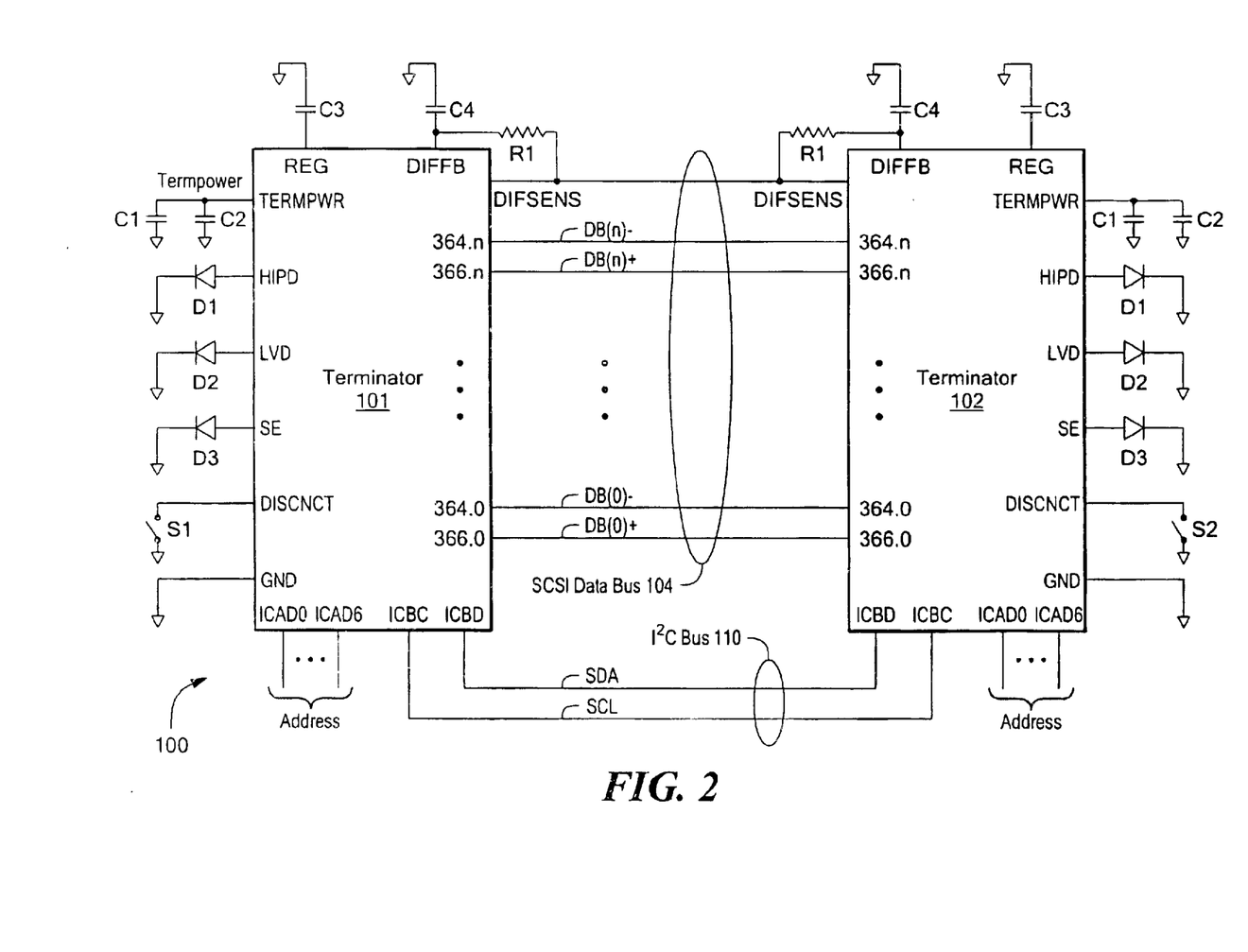
FIG. 2 is a block diagram illustrating connections between the bus and the line terminator devices of FIG. 1.

FIG. 2 depicts the electronic system 100 (see also FIG. 1) showing the interconnections between the programmable line terminator devices 101–102, the SCSI data bus 104, and the $I^2C$ bus 110 in greater detail. In the presently disclosed embodiment, the line terminator devices 101–102 comprise identical programmable multi-line active terminators, which may be implemented as Integrated Circuits (ICs) or hybrid circuits.

As shown in FIG. 2, each of the line terminator devices 101–102 has a plurality of power, ground, and signal connections. Specifically, each line terminator 101–102 has a plurality of outputs 364.0–364.n, 366.0366.n connected to the lines DB(0)– through DB(n)–, DB(0)+ through DB(n)+, respectively, of the SCSI data bus 104, and a plurality of Inputs/Outputs (I/Os) ICBC and ICBD connected to the SCL line and the SDA line, respectively, of the $I^2C$ bus 110. Further, each line terminator device 101–102 has a power connection TERMPWR connected to a power supply voltage Termpower and by-pass capacitors C1–C2, and a ground connection GND connected to ground potential. Moreover, each line terminator device 101–102 has a plurality of inputs ICAD0–ICAD6, which may be operatively coupled to a corresponding plurality of switches (not shown) for setting the unique address of the line terminator device. The remaining I/O connections REG, HIPD, LVD, SE, DISCNCT, DIFFB, and DIFSENS are described below with reference to FIG. 3. It is noted that the circuit components C1–C4, D1–D3, and R1 (see FIG. 2) connected to corresponding power and signal connections of the respective line terminator devices 101–102 represent circuit components having the same component values.

Figure 3:
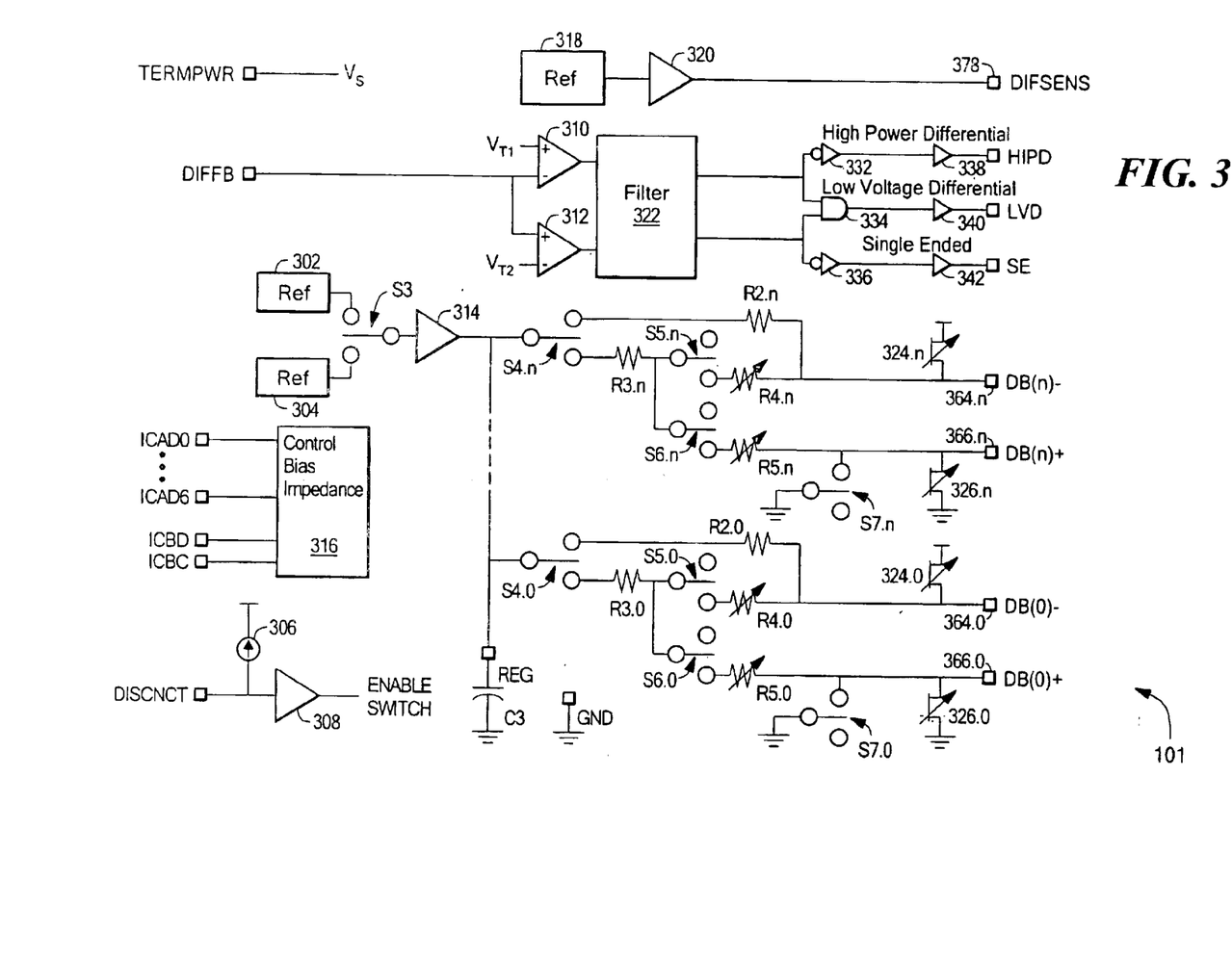
FIG. 3 is a schematic diagram of the line terminator device of FIG. 1.

FIG. 3 depicts an illustrative schematic diagram of the programmable line terminator device 101 included in the electronic system 100 (see FIGS. 1–2). It is understood that the line terminator device 102 (see FIGS. 1–2) is identical to the line terminator device 101, as depicted in FIG. 3. As described above, the line terminator device 101 has a power connection TERMPWR, which is connected to the power supply voltage Termpower ($V_s$) and the by-pass capacitors C1–C2 (see FIG. 2). The power connection TERMPWR provides the power supply voltage $V_s$ to all of the circuitry requiring such power within the line terminator device 101.

As shown in FIG. 3, the line terminator device 101 includes an internal voltage reference 318, which is coupled through a buffer 320 to an output 378. The voltage reference 318, the buffer 320, and the output 378 cooperate to drive the DIFSENS line of the SCSI data bus 104 to a suitable voltage level for detecting what types of SCSI devices 108.1–108.m are connected to the bus 104 (see FIGS. 1–2).

Specifically, the input DIFFB is connected through the resistor R1 to the DIFSENS line via the output 378 and connected through the capacitor C4 to ground (see FIG. 2).

The input DIFFB is further connected to comparators 310 and 312 (see FIG. 3), which are configured to detect what types of SCSI devices 108.1–108.m are on the SCSI data bus 104. In the presently disclosed embodiment, the positive (+) input of the comparator 310 is connected to a first threshold voltage $V_{T1}$, and the negative (−) input of the comparator 312 is connected to a second threshold voltage $V_{T2}$. The respective outputs of the comparators 310 and 312 are provided to a filter 322, which may comprise a digital filter or any other suitable filter. The filter 322 provides a first output to an inverter 322, which has its output coupled to the output HIPD through a buffer 338. Similarly, the filter 322 provides a second output to an inverter 336, which has its output coupled to the output SE through a buffer 342. The filter 322 also provides the first and second outputs to an AND gate 334, which has its output coupled to the output LVD through a buffer 340. Based at least in part on the types of SCSI devices 108.1–108.m connected to the SCSI data bus 104, the output SE provides a TTL-compatible status bit indicating that a single ended voltage is present on the DIFFB input, the output LVD provides a TTL-compatible status bit indicating that a low-voltage-differential voltage is present on the DIFFB input, or the output HIPD provides a TTL-compatible status bit indicating that a high-power-differential voltage is present on the DIFFB input. The outputs SE, LVD, and HIPD are coupled to ground through diodes D1, D2, and D3 (see FIG. 2), respectively.

As shown in FIG. 3, the line terminator device 101 has the input DISCNCT, which controls the termination lines DB(0)−, DB(0)+ through DB(n)−, DB(n)+ until the line terminator 101 is programmed via the I²C bus 110 (see FIGS. 1–2). The DISCNCT input is coupled to a current source 306 and a buffer 308, which provides an ENABLE SWITCH control signal to Single-Pole Double-Throw (SPDT) switches S3, S4.0–S4.n, S5.0–S5.n, S6.0–S6.n, and S7.0–S7.n. In the illustrated embodiment, before the line terminator devices 101–102 are programmed, Single-Pole Single-Throw (SPST) switches S1–S2 (see FIG. 2) are closed to cause the ENABLE SWITCH control signal at the output of the buffer 308 to be pulled down to ground. As a result, the SPDT switches S3, S4.0–S4.n, S5.0–S5.n, S6.0–S6.n, and S7.0–S7.n are placed in an intermediate position, thereby causing the outputs 364.0–364.n and 366.0–366.n of the line terminator 101 to float. In the event the line terminator devices 101–102 are programmed via the I²C bus 110, the SPST switches S1–S2 are opened to cause the ENABLE SWITCH control signal at the output of the buffer 308 to be pulled up. As a result, the SPDT switches S3, S4.0–S4.n, S5.0–S5.n, S6.0–S6.n, and S7.0–S7.n are enabled and may be subsequently put in either an "up" or "down" position, thereby causing the circuitry of the line terminator 101 to conform to the data bus 104 configured as either a single ended bus or a low voltage differential bus, respectively.

Specifically, the line terminator device 101 includes a termination impedance/bias control unit 316, which is configured to control the position of the enabled SPDT switches S3, S4.0–S4.n, S5.0–S5.n, S6.0–S6.n, and S7.0–S7.n based at least in part on the address and control signals carried by the I²C bus 110. As described above, the line terminator 101 has the plurality of inputs ICAD0–ICAD6 that may be coupled to a corresponding plurality of switches (not shown) to set the unique address of the device. The termination impedance/bias control unit 316 is coupled to the inputs ICAD0–ICAD6 to detect the unique address setting of the line terminator 101. As also described above, the line terminator 101 has the inputs ICBC and ICBD that are connected to the SCL line and the SDA line, respectively, of the I²C bus 110. The termination impedance/bias control unit 316 is further coupled to the inputs ICBC and ICBD to receive the address and control signals carried by the I²C bus 110. A serial transmission sequence for providing the address and control signals to the termination impedance/bias control unit 316 of the line terminator 101 is described below with reference to FIG. 4.

As shown in FIG. 3, the line terminator device 101 comprises a programmable multi-line active terminator. In the illustrated embodiment, the line terminator 101 includes internal voltage references 302 and 304. Respective outputs of the voltage references 302 and 304 are switchably connected to the input of a buffer 314 by the SPDT switch S3. Further, the output of the buffer 314 is connected to the external by-pass capacitor C3 to smooth the outputs of the voltage references 302 and 304. In the illustrated embodiment, the combination including the voltage references 302 and 304 and the buffer 314 operates as a source/sink regulator.

In the event the line terminator 101 is programmed to put the SPDT switches S3, S4.0–S4.n, S5.0–S5.n, S6.0–S6.n, and S7.0–S7.n in the "up" position, the input of the buffer 314 is connected to the voltage reference 302 by the switch S3 and the output of the buffer 314 is connected to the respective first ends of the resistors R2.0–R2.n by the switches S4.0–S4.n. It is noted that the second ends of the resistors R2.0–R2.n are connected to the outputs 364.0–364.n, which in turn are coupled to the lines DB(0)− through DB(n)− of the SCSI data bus 104 (see FIGS. 1–2). Further, the resistors R3.0–R3.n, R4.0–R4.n, and R5.0–R5.n are disconnected; and, the outputs 366.0–366.n (which are coupled to the lines DB(0)+ through DB(n)+ of the SCSI data bus 104; see FIGS. 1–2) are connected to ground by the switches S7.0–S7.n. As a result, the line terminator 101 is programmably configured for optimally terminating the SCSI data bus 104 for single ended operation.

In the event the line terminator 101 is programmed to put the SPDT switches S3, S4.0–S4.n, S5.0–S5.n, S6.0–S6.n, and S7.0–S7.n in the "down" position, the input of the buffer 314 is connected to the voltage reference 304 by the switch S3 and the output of the buffer 314 is connected to the respective first ends of the resistors R3.0–R3.n by the switches S4.0–S4.n. The second ends of the resistors R3.0–R3.n are connected to the respective first ends of the programming resistors R4.0–R4.n by the switches S5.0–S5.n, and the respective first ends of the programming resistors R5.0–R5.n by the switches S6.0–S6.n. The second ends of the programming resistors R4.0–R4.n are connected to respective current sources 324.0–324.n and the outputs 364.0–364.n, which in turn are coupled to the lines DB(0)− through DB(n)− of the SCSI data bus 104. Similarly, the second ends of the programming resistors R5.0–R5.n are connected to respective current sources 326.0–326.n and the outputs 366.0–366.n, which in turn are coupled to the lines DB(0)+ through DB(n)+ of the SCSI data bus 104. The resistors R2.0–R2.n are disconnected. It is noted that the line terminator 101 may be further programmed via the programming resistors R4.0–R4.n and R5.0–R5.n to set the values of the current sources 324.0–324.n and 326.0–326.n to adjust the bias at the outputs 364.0–364.n and 366.0–366.n of the device 101. As a result, the line terminator 101 is programmably configured for optimally terminating the SCSI data bus 104 for low voltage differential operation.

Accordingly, the presently disclosed line terminator devices 101–102 (see FIG. 1) can be programmed via the SES controller 106 for optimally terminating the SCSI data bus 104 by sending suitable address and control signals to the termination impedance/bias control units 316 of the respective devices 101–102 over the I²C bus 110. For example, the termination impedance/bias control unit 316 may receive the address/control signals provided by the SES controller 106 over the I²C bus 110, and subsequently employ a tuning algorithm that minimizes data errors on the SCSI data bus 104, or a lookup table corresponding to the bus configuration (e.g., HIPD, LVD, or SE), to provide optimal termination impedance for the bus 104. As described above, the termination impedance/bias control unit 316 provides the optimal termination impedance and bias for the SCSI data bus 104 at the outputs 364.0–364.n and 366.0–366.n by suitably actuating the SPDT switches S3, S4.0–S4.n, S5.0–S5.n, S6.0–S6.n, and S7.0–S7.n and setting the values of the current sources 324.0–324.n and 326.0–326.n.

Figure 4:
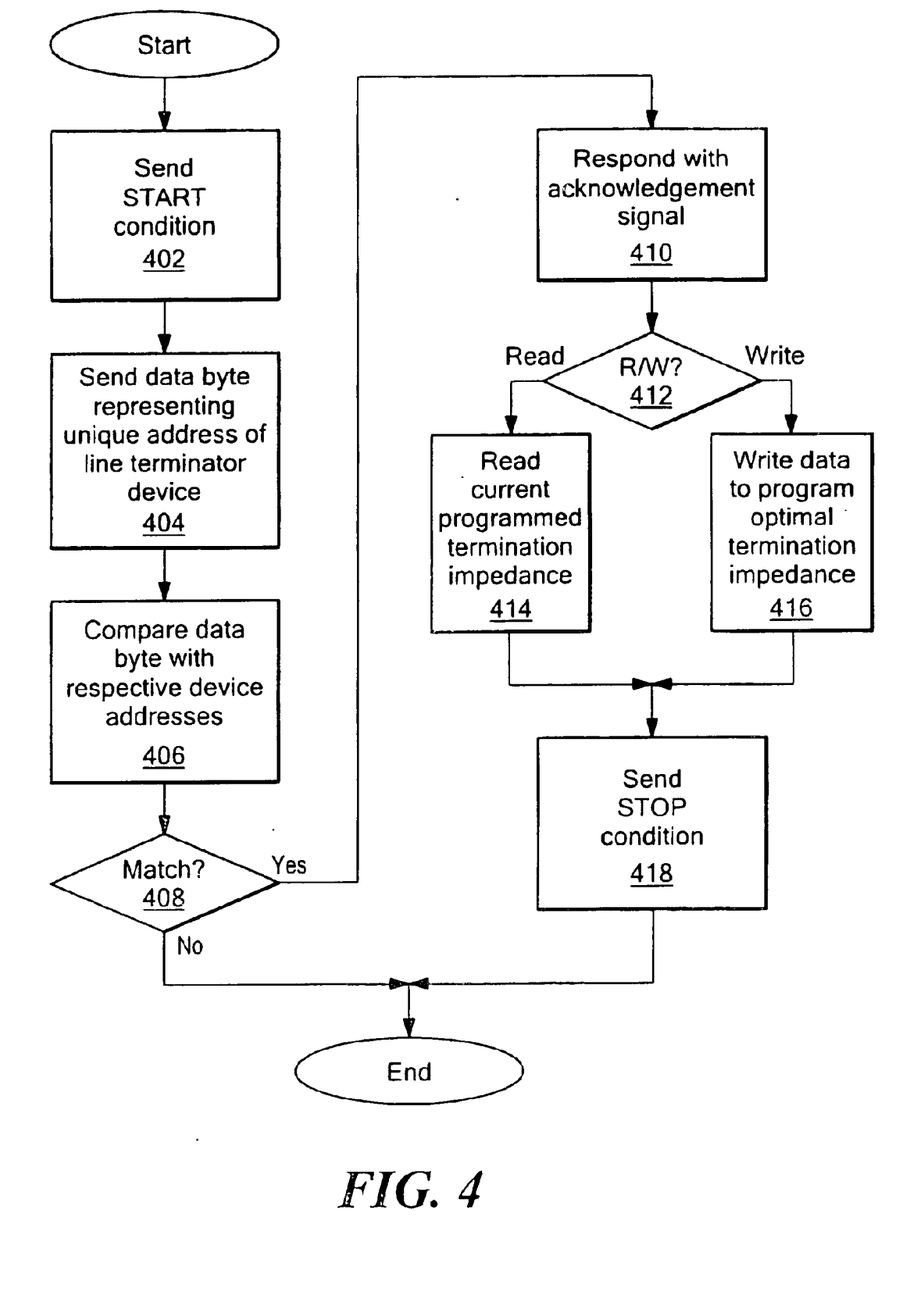
FIG. 4 is a flow diagram illustrating a method of programming the line terminator device of FIG. 1.

A method of programming the line terminator device 101 (see FIGS. 1–3) using the above-mentioned serial transmission sequence is illustrated by reference to FIG. 4. As depicted in step 402, a Start condition is sent via the SES controller 106 to the line terminator devices 101–102 over the I²C bus 110. In the presently disclosed embodiment, the SES controller 106 sends the Start condition by causing a high-to-low transition to occur on the SDA line while the SCL line is logical high. The Start condition is used as an "attention" signal for all of the devices (i.e., the line terminator devices 101–102) connected to the I²C bus 110, thereby causing each of the devices 101–102 to "listen" for a first data byte on the SDA line to see whether this data byte matches its unique address. Next, the SES controller 106 sends, as depicted in step 404, the first data byte representing the unique address of one of the line terminator devices 101–102. In the presently disclosed embodiment, the SES controller 106 sends the Most Significant Bit (MSB) of this data byte first over the SDA line along with a data direction bit indicating a data Read (R) or a data Write (W). Each of the line terminator devices 101–102 then receives, as depicted in step 406, the first data byte over the SDA line and compares this data byte with its own address. A determination is then made, as depicted in step 408, as to whether the first data byte matches the unique address of one of the line terminator devices 101–102. In the event there is a match, the device with the matching address (e.g., the line terminator 101) responds, as depicted in step 410, to the SES controller 106 with an acknowledgement signal. In the presently disclosed embodiment, the acknowledgement signal comprises a logical low level on the SDA line during the logical high level of the corresponding clock pulse on the SCL line. Next, a determination is made, as depicted in step 412, as to whether the data direction bit is logical high or low. In the event the data direction bit is logical high indicating a data Read, the SES controller 106 receives, as depicted in step 414, a second data byte on the SDA line provided by the line terminator 101 indicating the current programmed termination impedance and bias of the device 101. In the event the data direction bit is logical low indicating a data Write, the SES controller 106 sends, as depicted in step 416, a third data byte over the SDA line to the line terminator device 101 to program the device 101 to provide optimal termination impedance and bias for the SCSI data bus 104. It is noted that the device(s) with the non-matching address (i.e., the line terminator 102) ignores this data byte sent by the SES controller 106. Finally, the SES controller 106 sends, as depicted in step 418, a Stop condition to the line terminator 101, thereby indicating that the R/W operation has been completed and the I²C bus 110 has been released. In the presently disclosed embodiment, the SES controller 106 sends the Stop condition by causing a low-to-high transition to occur on the SDA line while the SCL line is logical high. It is understood that the line terminator programming method of FIG. 4 including the above-described serial transmission sequence is presented for purposes of illustration, and that other suitable serial transmission sequences and protocols may be employed to program the line terminator devices 101–102.

It will further be appreciated by those of ordinary skill in the art that modifications to and variations of the above-described programmable line terminator may be made without departing from the inventive concepts disclosed herein. Accordingly, the invention should not be viewed as limited except as by the scope and spirit of the appended claims.

What is claimed is:

1. A line terminator for terminating at least one transmission line or bus, comprising:

programmable line termination circuitry coupleable to the at least one transmission line or bus, the line termination circuitry being configured to provide adjustable termination impedance for the transmission line or bus; and control circuitry configured to receive at least one first control signal and programmably configure the line termination circuitry based on the at least one first control signal, thereby adjusting the termination impedance provided by the line termination circuitry, wherein the control circuitry is coupleable to the at least one transmission line or bus, the control circuitry being configured to receive the at least one first control signal over the at least one transmission line or bus, and wherein the control circuitry is further configured to receive at least one second control signal for setting a unique address of the line terminator on the transmission line or bus.

2. The line terminator of claim 1 wherein the line termination circuitry comprises at least one active terminator.

3. The line terminator of claim 1 wherein the control circuitry is further configured to programmably configure the line termination circuitry based on the at least one first control signal for adjusting at least one termination bias value.

4. A line terminator for terminating at least one transmission line or bus, comprising:

programmable line termination circuitry coupleable to the at least one transmission line or bus, the line termination circuitry being configured to provide adjustable termination impedance for the transmission line or bus; and control circuitry configured to receive at feast one first control signal and programmably configure the line termination circuitry based on the at least one first control signal, thereby adjusting the termination impedance provided by the line termination circuitry, wherein the control circuitry is coupleable to at least one line separate from the transmission line or bus, the control circuitry being configured to receive the at least one first control signal over the at least one separate line.

5. The line terminator of claim 4 wherein the control circuitry is further configured to receive at least one second control signal for setting a unique address of the line terminator on the at least one separate line.

6. The line terminator of claim 4 wherein the at least one separate line comprises an I²C bus.

7. A line terminator for terminating at least one transmission line or bus, comprising:

programmable line termination circuit coupleable to the at least one transmission line or bus, the line termination circuitry being configured to provide adjustable termination impedance for the transmission line or bus; and control circuitry configured to receive at least one first control signal and programmably configure the line termination circuitry based on the at least one first control signal, thereby adjusting the termination impedance provided by the line termination circuitry, wherein the at least one transmission line or bus has one or more devices connected thereto, the line terminator further including detection circuitry configured to detect what types of devices are connected to the transmission line or bus, and wherein the control circuitry is configured to programmably configure the line termination circuitry based at least in part on the types of devices detected on the transmission line or bus.

8. A line terminator for terminating at least one transmission line or bus, comprising:

programmable line termination circuitry coupleable to the at least one transmission line or bus, the line termination circuitry being configured to provide adjustable termination impedance for the transmission line or bus; and control circuitry configured to receive at least one first control signal and programmably configure the line termination circuitry based on the at least one first control signal, thereby adjusting the termination impedance provided by the line termination circuitry, wherein the at least one transmission line or bus comprises a SCSI bus, and wherein the SCSI bus is selected from the group consisting of a single ended bus, a low voltage differential bus, and a high power differential bus.

9. The line terminator of claim 8 wherein the SCSI bus has a SCSI controller and one or more SCSI devices connected thereto, the SCSI controller being configured to provide the at least one first control signal to the control circuitry of the line terminator.

10. A line terminator for terminating at least one transmission line or bus, comprising:

programmable line termination circuitry coupleable to the at least one transmission line or bus, the line termination circuitry being configured to provide adjustable termination impedance for the transmission line or bus; and control circuitry configured to receive at least one first control signal and programmably configure the line termination circuitry based on the at least one first control signal, thereby adjusting the termination impedance provided by the line termination circuitry, wherein the control circuitry is further configured to employ a tuning algorithm for minimizing data errors on the transmission line or bus when adjusting the termination impedance provided by the line termination circuitry.

11. A line terminator for terminating at least one transmission line or bus, comprising:

programmable line termination circuitry coupleable to the at least one transmission line or bus, the line termination circuitry being configured to provide adjustable termination impedance for the transmission line or bus; and control circuitry configured to receive at least one first control signal and programmably configure the line termination circuitry based on the at least one first control signal, thereby adjusting the termination impedance provided by the line termination circuitry, wherein the control circuitry is further configured to employ a lockup table corresponding to a predetermined configuration of the transmission line or bus when adjusting the termination impedance provided by the line termination circuitry.

12. An electronic system, comprising:

a bus; and at least one line terminator connected to the bus, the line terminator being configured to terminate the bus, the line terminator including programmable line termination circuitry coupleable to the bus the line termination circuitry being configured to provide adjustable termination impedance for the bus, and control circuitry configured to receive at least one control signal and programmably configure the line termination circuitry based on the at least one control signal, thereby adjusting the termination impedance provided by the line termination circuitry, wherein the control circuitry is coupleable to at least one line separate from the bus, the control circuitry being configured to receive the at least one control signal over the at least one separate line.

13. The system of claim 12 wherein the bus comprises a SCSI bus.

14. The system of claim 12 wherein the SCSI bus is selected from the group consisting of a single ended bus, a low voltage differential bus, and a high power differential bus.

15. The system of claim 12 wherein the SCSI bus has a SCSI controller and one or more SCSI devices connected thereto, the SCSI controller being configured to provide the at least one control signal to the control circuitry of the line terminator.

16. The system of claim 12 wherein the at least one separate line comprises an I²C bus.

17. A method of programmably terminating at least one transmission line or bus, comprising the steps of:

connecting programmably line termination circuitry to the at least one transmission line or bus the line termination circuit being operative to provide adjustable termination impedance for the transmission line or bus;

receiving at least one control signal by control circuitry, the control circuitry being operative to adjust the termination impedance provided by the line termination circuitry; and programmably configuring the line termination circuitry based on the at least one control signal by the control circuitry, thereby adjusting the termination impedance provided by the line termination circuitry, wherein the receiving step includes receiving the at least one control signal over the transmission line or bus by the control circuitry.

18. The method of claim 17 further including the step of detecting what types of devices are connected to the transmission line or bus by detection circuitry.

19. The method of claim 17 wherein the configuring step includes programmably configuring the line termination circuitry based on the at least one control signal by the control circuitry to adjust at least one termination bias value.

20. A method of programmably terminating at least one transmission line or bus, comprising the steps of:

connecting programmable line termination circuitry to the at least one transmission line or bus, the line termination circuitry being operative to provide adjustable termination impedance for the transmission line or bus;

receiving at least one control signal by control circuitry, the control circuitry being operative to adjust the termination impedance provided by the line termination circuitry; and programmably configuring the line termination circuitry based on the at least one control signal by the control circuitry, thereby adjusting the termination impedance provided by the line termination circuitry, wherein the receiving step includes receiving the at least one control signal over at least one line separate from the transmission line or bus by the control circuitry.

21. The method of programmably termination at least one transmission line or bus, comprising the steps of:

connecting programmable line termination circuitry to the at least one transmission line or bus, the line termination circuitry being operative to provide adjustable termination impedance for the transmission line or bus;

receiving at least one control signal by control circuitry, the control circuitry being operative to adjust the termination impedance provided by the line termination circuitry;

programmably configuring the line termination circuitry based on the at least one control signal by the control circuitry, thereby adjusting the termination impedance provided by the line termination circuitry, and including the step of detecting what types of devices are connected to the transmission line or bus by detection circuitry, wherein the configuring step include programmably configuring the line termination circuitry based at least in part on the types of devices detected on the transmission line or bus.

* * * * *